Patented Jan. 16, 1945

2,367,453

UNITED STATES PATENT OFFICE 2,367,453

STORAGE BATTERY ELECTRODE

Harland D. Wilson, Toledo, Ohio, assignor to The Electric Auto-Lite Company, Toledo, Ohio, a corporation of Ohio No Drawing. Application August 3, 1940, Serial No. 351,261

7 Claims. (Cl. 136—26)

The present invention relates to electric storage batteries and contemplates particularly the provision of storage battery plates having improved performance. The objects of the invention are attained by incorporating into the active material of the plates certain nitrogen-containing organic substances hereinafter more fully described. The invention has particular reference to providing a storage battery having increased capacity at low temperatures resulting from the beneficial effects produced in the negative plates by these nitrogen-containing organic substances.

It has been found that nitrogen can be added to, or caused to enter into combination with, certain organic materials such as peat, lignite, lignin, waste paper mill products, humic substances and other carbohydrates of plant origin by subjecting these materials to liquid or gaseous ammonia at elevated temperatures and pressures. In this manner, new chemical compounds are formed with a fixed nitrogen content ranging from a fraction of 1 per cent to approximately 11 per cent. The amount of nitrogen added depends on such factors as temperature, pressure, moisture content and time of treatment.

I have discovered that these organic substances, which have been given a fixed nitrogen content by ammoniation, are capable, when incorporated in suitable amounts in the active material of storage battery plates, of activating the plates in such a manner as to produce desired improvements in battery performance.

While methods of ammoniation or ammonolysis of organic substances are well-known in the art, having been described in the chemical literature, and the present invention is not directed to a specific method of ammoniation, for purposes of illustration only and not by way of limitation, I will describe one method which may be advantageously used.

Waste sulphite liquor from paper manufacture is neutralized with lime and an excess added to bring the pH value to 9.6. The free sulphur dioxide in the liquor is thus precipitated as calcium sulphite. The liquor is permitted to stand about a day and the supernatant liquor is then removed and concentrated by evaporation to approximately 47% total solids. Ammonium hydroxide is added in such an amount that there will be an excess at the end of the cook, and the whole is subjected to a temperature of approximately 173° F. and a gage pressure of approximately 140 lbs. per square inch for a period of one and one-half hours. The solids are thereafter separated from the liquor and are ready for use. I have found that it is preferable, from the standpoint of convenience in handling, transporting and weighing, to dry the solids after their removal from the liquor, but otherwise they may be used just as advantageously in the form of a paste or a dispersion as in the dry state. When treating waste sulphite from the manufacture of paper pulp from hemlock, the process as above described will result in an organic solid substance having a fixed nitrogen content of the order of 3%.

It will be understood, however, that in treating other organic substances the conditions of time, temperature and pressure will be varied somewhat in order to give the desired result. A few experiments with any given substance will suffice to determine proper processing conditions. I have found that for automobile starting and lighting batteries, a fixed nitrogen content of the order of 3 per cent by weight is preferable, although for various types and conditions of service, the desirable percentage of nitrogen content ranges from approximately 1% to approximately 11% by weight.

In carrying out my invention, I prefer to use from 0.1% to 3.0% by weight of the ammoniated material, incorporating it in the active material of the plate in the manner pointed out below or in any other suitable manner. It is appropriate to utilize with my ammoniated expander, such well-known and customary expander materials as barium sulphate and/or lampblack substantially in normal proportions.

A specific example of carrying out my invention is as follows:

Ten pounds of dried ammoniated organic material, ten pounds of barium sulphate and three pounds of lampblack are mixed with four gallons of water to form a slurry. The slurry is then added to 2000 pounds of lead oxide which may be litharge, a mixture of litharge and red lead, or litharge with finely divided metallic lead intermingled therewith, and the whole is mixed in a conventional type paste mixer, either water or dilute sulphuric acid, or both, being added during the mixing operation until it has been brought to a homogeneous mass of proper density and pasting consistency. The paste is then applied to the storage battery plate in the usual manner. The slurry may be added to the dry oxide, or it may be added after the mixing operation has begun and the water or sulphuric acid has been added to the oxide.

Another satisfactory manner of incorporating the ammoniated material in the paste is to mix said material with barium sulphate, lampblack and lead oxide in the above proportions while all are in the dry state. When this mixture has become thoroughly blended, it is placed in a paste mixer and water or dilute sulphuric acid, or both, are added to form the paste.

Again, the ammoniated organic substance may be dispersed in a liquid into which battery plates containing active material, or material to become active, are dipped.

The organic substances above referred to, when given a fixed nitrogen content by ammoniation, exhibit entirely different physical and chemical characteristics than in their unammoniated state, and, when incorporated in the active material of storage battery plates, particularly the negative plates, have an extremely beneficial effect on the performance of the battery. For example, I have discovered that the performance of a storage battery, when operating at low temperatures, as when starting the engine of an automobile out-of-doors in the winter time, is greatly improved by including in the active material of the negative plates, a small amount of ammoniated organic substances of the type described.

A peculiar and valuable characteristic of storage batteries manufactured in accordance with my invention is that as the batteries are used, their performance at low temperatures improves to a point, in many instances, nearly double the original low temperature output. From that point during the remainder of the life of the battery, its cold temperature performance is maintained extremely high as compared with storage batteries heretofore in use.

Another beneficial result flowing from the use of said substances is the facility of processing the battery plates during manufacture. It is customary either to pickle or dry freshly pasted battery plates so that they may be further handled without being damaged. A convenient manner of drying is that disclosed in U. S. Patent No. 1,670,047 to Wm. J. Plews. I have found that battery plates manufactured in accordance with my invention may be satisfactorily dried by said process whereas battery plates in which other organic materials have been used, for example, unammoniated sulphite waste liquor solids, may not be satisfactorily dried by said process.

While certain percentages and proportions have been set forth above, I do not wish to be limited to them as it may be desirable in certain instances to vary the same. Many other modifications may occur to those skilled in the art. For example, the ammoniated organic material in the dry state may be dusted or otherwise incorporated in the surface of the battery electrodes. It is my intention that this patent shall cover all such modifications as come within the scope of the appended claims.

Having thus fully described my invention, what I claim is:

1. A lead-acid type of storage battery plate having an expander consisting of ammoniated sulphite waste liquor solids.

2. A negative plate for a lead-acid type of storage battery having incorporated in the active material thereof ammoniated sulphite waste liquor solids.

3. A paste for lead-acid battery electrodes consisting of 97% to 99.9% by weight lead oxide and .1% to 3% by weight ammoniated sulphite waste liquor solids.

4. A paste for lead-acid battery electrodes, the ingredients of which are lead oxide, barium sulphate, lampblack and ammoniated sulphite waste liquor solids.

5. A paste for lead-acid battery electrodes consisting of 0.1% to 3.0% by weight of ammoniated sulphite waste liquor solids, .5% by weight of barium sulphate, .15% by weight of lampblack and the balance lead oxide.

6. A paste for lead-acid battery electrodes in accordance wtih claim 5 in which the ammoniated sulphite waste liquor solids has a nitrogen content of from 1% to 11% by weight.

7. A paste for lead-acid battery electrodes in accordance with claim 5 in which the ammoniated sulphite waste liquor solids has a nitrogen content of substantially 3% by weight.

HARLAND D. WILSON.